US012191052B2

(12) United States Patent
Zamir et al.

(10) Patent No.: US 12,191,052 B2
(45) Date of Patent: Jan. 7, 2025

(54) DIELECTRIC HIGH GRADIENT INSULATOR AND METHOD OF MANUFACTURE

(71) Applicant: RAFAEL ADVANCED DEFENSE SYSTEMS LTD., Haifa (IL)

(72) Inventors: Shai Zamir, Haifa (IL); Michal Sakajio, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 297 days.

(21) Appl. No.: 17/633,595

(22) PCT Filed: Sep. 24, 2020

(86) PCT No.: PCT/IB2020/058949
§ 371 (c)(1),
(2) Date: Feb. 8, 2022

(87) PCT Pub. No.: WO2021/059193
PCT Pub. Date: Apr. 1, 2021

(65) Prior Publication Data
US 2022/0293295 A1 Sep. 15, 2022

(51) Int. Cl.
*H01B 3/10* (2006.01)
*H01B 3/00* (2006.01)
*H01B 3/12* (2006.01)

(52) U.S. Cl.
CPC ............... *H01B 3/10* (2013.01); *H01B 3/002* (2013.01); *H01B 3/12* (2013.01)

(58) Field of Classification Search
None
See application file for complete search history.

(56) References Cited

U.S. PATENT DOCUMENTS 5,660,878 A * 8/1997 Le Gressus ............ H01B 3/105 427/205
2018/0215129 A1* 8/2018 Tada ........................ B32B 27/28
2020/0027673 A1* 1/2020 Benkert ........... H01H 33/66207

FOREIGN PATENT DOCUMENTS

DE 102017201326 A1 * 8/2018 ....... H01H 33/66207
EP 2806432 A1 * 11/2014 ............. H01B 17/42
WO 9833228 A2 7/1998
WO 9927419 A1 6/1999
(Continued)

OTHER PUBLICATIONS

Hargrave's Communications Dictionary, Wiley, definition of "order of magnitude." (Year: 2001).*
(Continued)

*Primary Examiner* — David Sample
(74) *Attorney, Agent, or Firm* — Rivka Friedman

(57) ABSTRACT

A dielectric high gradient insulator device comprises a stack of at least two dielectric layers which are in physical contact with each other and which have different dielectric constants. At least two dielectric layers are configured to form a shaped electric field, when the device is placed between electrodes having a voltage difference. The shaped electric field is in a region proximal to a surface of the at least two dielectric layers, and causes deflection of negatively charged particles away from the surface, thereby inhibiting voltage breakdown of the device. A method of manufacturing the device is also presented.

7 Claims, 6 Drawing Sheets

(56) References Cited

FOREIGN PATENT DOCUMENTS

| | | | |
|---|---|---|---|
| WO | 2010019616 | A2 | 2/2010 |
| WO | 2018232495 | A1 | 12/2018 |

OTHER PUBLICATIONS

Israel Office Action, Application No. 269739, Dec. 19, 2022.

Leopold J G et al: "Different approach to pulsed high-voltage vacuum-insulation design" Physical Review Special Topics—Accelerators and Beams American Physical Society USA, vol. 10, No. 6, Jun. 5, 2007 (Jun. 5, 2007), pp. 060401-1-060401-14, XP002565024.

Sampayan S et al: "High gradient insulator technology for the dielectric wall accelerator" Proceedings Particle Accelerator Conference May 1-5, 1995 Dallas, TX, USA, vol. 2, May 1, 1996 (May 1, 1996), pp. 1269-1271, XP002565025.

* cited by examiner

DIELECTRIC HIGH GRADIENT INSULATOR AND METHOD OF MANUFACTURE

FIELD AND BACKGROUND OF THE INVENTION

The invention relates to high voltage vacuum insulators, such as those in charged particle beam accelerators, and specifically, to a dielectric high gradient index insulator with improved vacuum and voltage standoff performance and with improved manufacturability.

The electrical strength of vacuum insulators places a lower limit on the size of particle accelerators and pulsed voltage systems. Generally, the higher the voltage standoff of an insulating material, the higher is the electrical field strength it can sustain without voltage breakdown, and the smaller is the thickness of insulator needed to separate a pair of electrodes with a given high voltage difference.

When subjected to strong electric fields, vacuum insulators generally fail by surface flashover or by metal evaporation and deposition on insulator surfaces. Surface flashover occurs when a charged particle, such as an ion or an electron, impacts the wall of a vacuum insulator and initiates a secondary electron avalanche. A high gradient insulator (HGI) consisting of alternating metallic and dielectric layers, has been found to withstand much higher voltage differences than a monolithic dielectric material of the same thickness, presumably because the metal layers absorb secondary electrons thereby preventing them from forming electron avalanches.

A key failure mechanism of HGI's is metal evaporation and deposition on insulator surfaces, which occurs when a vacuum arc is formed between consecutive metal layers. Successive depositions of metal degrade the voltage standoff of the insulator and, by creating a short-circuit path, may lead to catastrophic voltage breakdown.

In the manufacture of an HGI, great care is needed to form the junctions between the metal and dielectric layers. To avoid arcing, the metal layers must not protrude into the vacuum even slightly beyond the edges of the dielectric layers. Furthermore, the brazed junctions between metal and dielectric must have no irregularities that might amplify the strengths of local electric fields causing voltage breakdown.

Brazing of alternating layers of metal and ceramic presents additional technological challenges and difficulties. First, each metal-ceramic interface must be leak tested for vacuum compatibility. Second, brazing requires sublayers of brazing filler and metallization, which makes it impossible to implement designs having very thin layers. Third, the mechanical strength and vacuum integrity of the brazed structure is inferior to that of a monolithic insulator.

Lithographic processes for depositing metal on a ceramic surface, as an alternative to brazing, also have several drawbacks. Deposition on the inner surface of small cylinders is limited by illumination angle considerations. Furthermore, additional etching processes are needed to prevent metal layers from protruding outward from the ceramic, and giving rise to vacuum arc breakdown.

For all of the reasons given above, it would be desirable to have an HGI structure which has no metal layers, does not require brazing, and is entirely made of dielectric materials. The present invention provides just such a structure.

SUMMARY OF THE INVENTION

The present invention is a dielectric high gradient insulator device, or DHGI, and method of manufacture.

The device includes a stack of at least two dielectric layers having different dielectric constants. The layers are aligned along a longitudinal axis and are configured to form a shaped electric field in a region proximal to a surface of the layers when the DHGI is placed between electrodes having a voltage difference. The shaped electric field deflects negatively charged particles, such as negative ions and secondary electrons, away from the surface, thereby inhibiting avalanche formation and voltage breakdown of the insulator.

According to one feature of certain preferred implementations of the device, the device includes more than two dielectric layers having different values of dielectric constant which are arranged in an alternating structure.

According to a further feature of certain preferred implementations of the device, at least one of the dielectric layers has a gradual variation in dielectric constant.

According to a further feature of certain preferred implementations of the device, the device includes more than two dielectric layers having different values of dielectric constant which are arranged in an alternating structure and at least one dielectric layer having a gradual variation in dielectric constant.

According to a further feature of certain preferred implementations of the device, the different values of dielectric constant have a maximum value and a minimum value whose ratio is at least an order of magnitude.

According to a further feature of certain preferred implementations of the device, a surface of the dielectric layers includes a material having a secondary electron emission yield less than unity.

According to a further feature of certain preferred implementations of the device, at least one dielectric layer includes a low dielectric material selected from a group consisting of alumina ($Al_2O_3$), aluminum nitride (AlN), silicon dioxide ($SiO_2$), silicon nitride ($Si_3N_4$), titanium dioxide ($TiO_2$), polyamide, polystyrene, polyethylene, polyvinyl chloride (PVC), and plexiglass (Polymethyl methacrylate).

According to a further feature of certain preferred implementations of the device, at least one dielectric layer includes a high dielectric material selected from a group consisting of $BaTiO_3$, $PbTiO_3$, $LaTiO_3$, $SrTiO_3$, doped NiO, $CaCu_3Ti_4O_{12}$, doped $TiO_2$ or $\alpha FeO_{0.5}\beta_{0.5}O_3$, where $\alpha$ represents the elements Ba, Sr, or Ca and $\beta$ represents the elements Nb, Ta, or Sb.

According to a further feature of certain preferred implementations of the device, at least one dielectric layer includes metallic particles.

According to a further feature of certain preferred implementations of the device, the device is a component of a charged particle accelerator, a charged plasma source, an X-ray generating machine, or a pulsed power system.

The method for manufacturing a dielectric high gradient insulator device includes the steps of:

(a) providing a low dielectric matrix material;
(b) providing a filler material including high dielectric or metallic particles;
(c) preparing mixtures of matrix and filler materials;
(d) casting and/or printing layers with a pre-determined composition;
(e) aligning and hot-pressing dielectric layers to form a stack; and
(f) applying a densification process to the stack.

According to one feature of certain preferred implementations of the method, the densification process includes a sintering process.

According to a further feature of certain preferred implementations of the method, the method includes an additional step g) of treating one or more surfaces of the dielectric layers with a material having a secondary electron emission yield less than unity.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a dielectric high gradient insulator and method of manufacture. The principles of the invention may be better understood with reference to the drawings and the accompanying description.

Figure 1:
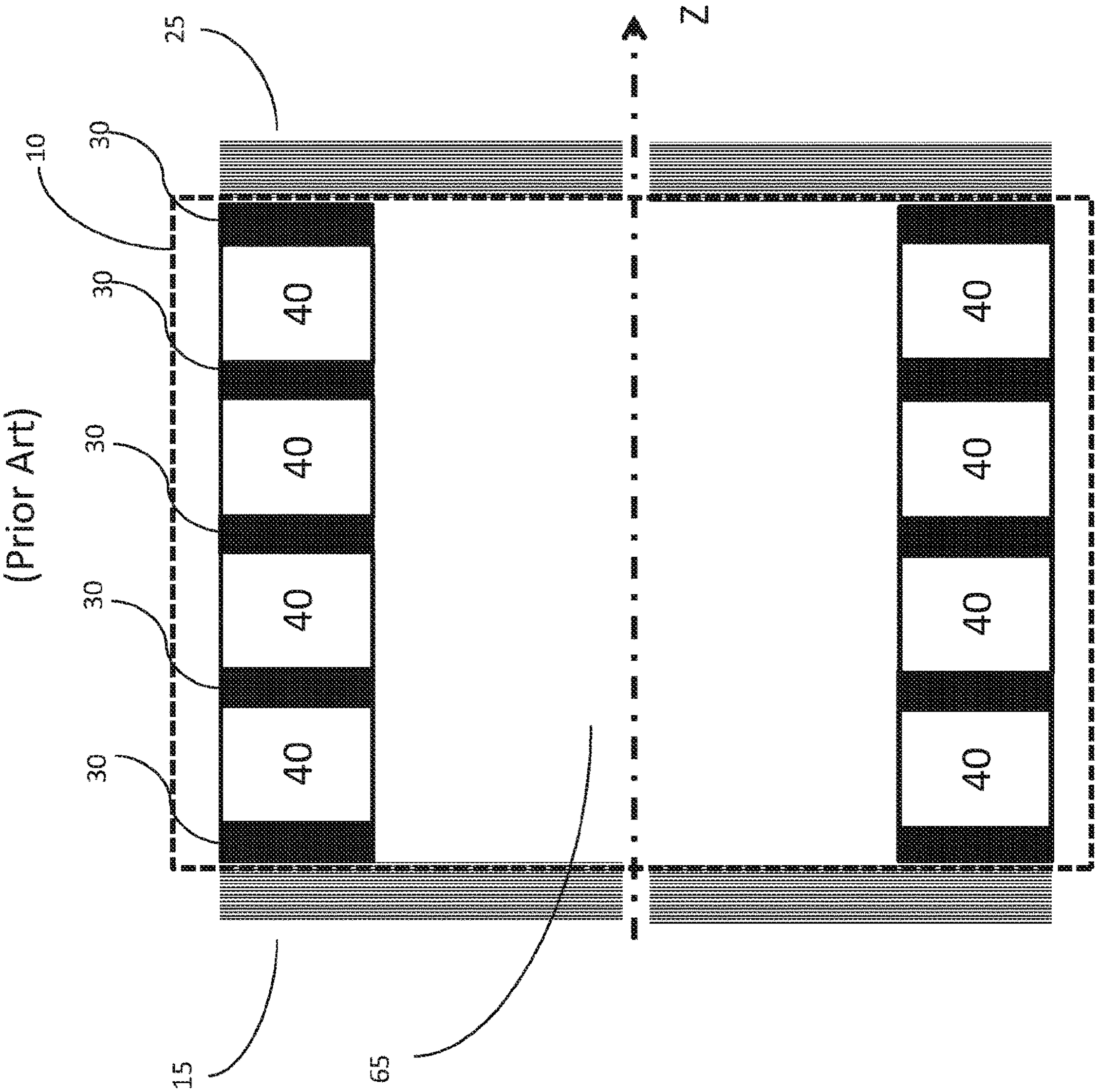
Fig. 1 (Prior Art)
FIG. 1 is a cross-sectional diagram of a metal-ceramic HGI, as is known in the prior art.

FIG. 1 shows a cross-sectional diagram of a prior-art metal-ceramic HGI. HGI 10 insulates two high-voltage electrodes 15 and 25, and forms a vacuum seal around vacuum cavity 65, which is cylindrically symmetric about a longitudinal axis Z. In a particle beam apparatus, for example, electrodes 15 and 25 may correspond to a cathode at ground potential and an anode, at +50 kilovolts, respectively. Cavity 65 is in high vacuum, with pressures in a range typically below $10^{-6}$ torr. HGI 10 consists of metal layers 30 and dielectric layers 40 in an alternating arrangement. The metal layers are typically made of stainless steel, molybdenum, or Kovar, which is a nickel-cobalt ferrous alloy.

The material composition of the dielectric layers is an insulating plastic, such as polyimide and polystyrene, or an insulating ceramic, such as alumina (aluminum oxide, $Al_2O_3$). Metal layers 30 divide the voltage difference between the two electrodes, with a roughly linear dependence on the axial coordinate Z. The voltage standoff of HGI 10 is up to four times higher than that of a uniform insulator, having the same overall length and diameter. Alternatively, HGI 10 can be made much smaller than a uniform alumina insulator, and still provide the same voltage standoff.

Figure 2:
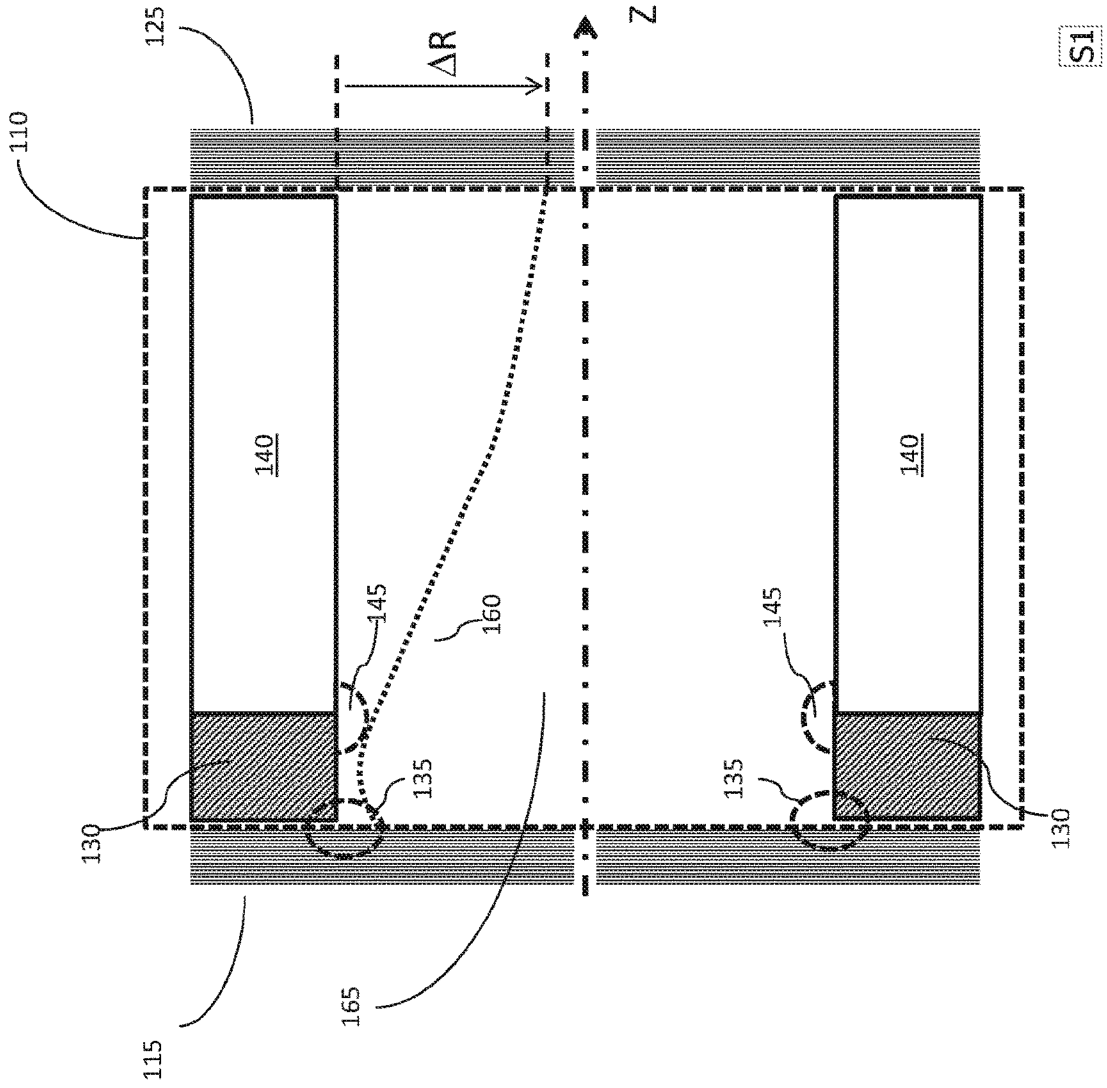
FIG. 2 is a cross-sectional diagram of an exemplary DHGI, according to a preferred embodiment of the invention, consisting of two dielectric layers.

FIG. 2 shows a cross-sectional diagram of an exemplary DHGI according to a preferred embodiment of the invention. DHGI 110 insulates high-voltage electrodes 115 and 125, and forms a vacuum seal around vacuum cavity 165, which may or may not be cylindrically symmetric with respect to longitudinal axis Z. Unlike HGI 10, DHGI 110 has no metal layers; rather, it is comprised of a dielectric layer 130 having a high dielectric constant, ε2, and an adjacent dielectric layer 140 having a dielectric constant, ε1, where ε2>ε1, and the dielectric ratio ε2/ε1 is typically in a range of 10 to several thousands. For example, layer 130 may consist of barium titanate having a dielectric constant of ε2=500, and layer 140 may consist of aluminum oxide, or alumina, having a dielectric constant of ε1=7.4.

The dielectric constant, or relative permittivity, ε, of a material increases with the ability to modify a charge distribution inside the material by applying an external electric field. In the electrostatic regime, the charge distribution inside a dielectric material subject to an externally applied electric field, D, induces an internal electric field, Eint, equal to D(1/ε−1). The total field inside the dielectric is then (D+Eint), which is equal to D/ε. As ε goes to infinity, Eint approaches (−D), and the total field inside the dielectric diminishes to zero, which is the case of a perfect conductor, e.g. a metal with zero resistivity. Thus, for large values of ε2, the charge distribution on the surface of dielectric layer 130 is similar to that of a metal layer having the same dimensions.

By way of illustration, electrode 115 it taken to be a cathode at ground potential, and electrode 125 to be an anode at a high positive potential, for example, 50 kilovolts. Emission areas 135 designate areas on the surface of electrode 115 which are near to a "triple point" where the surface of electrode 115 meets the surface of layer 130 and vacuum 165. Emission areas 135 are prone to secondary electron (SE) emission because of the presence of high extraction electric fields in these areas. As a result, SE's are emitted from electrode 115, typically with kinetic energies higher than 10 electron volts, and with initial velocity vectors pointing in random directions. After emission, the SE's are accelerated by electric fields existing in vacuum cavity 165. Once they are accelerated to energies of, say, 0.5 kilovolt or more, there is the possibility that they will generate additional SE's by colliding with the surface of one of the dielectric layers, thereby causing an electron avalanche and voltage breakdown by surface flashover.

Shaped electric field regions 145, which are inside the vacuum cavity and in close proximity to the interface between layers 130 and 140, are designed to prevent surface flashover. When ε2 is much greater than ε1, the electric field in regions 145 has a large component which is perpendicular to the Z-axis, and in a direction which deflects SE's away from the surface of layer 140. Trajectory 160 illustrates one such path of an SE emitted at the surface of electrode 115 inside area 135 in a direction which would impact layer 140, were it to travel in a straight line. As the SE approaches region 145, a shaped electric field deflects trajectory 160 towards the Z-axis. As a result, the SE is absorbed on anode electrode 125 at a point which is located at an electron intercept distance ΔR, away from the vacuum surface of layer 140.

The value of ΔR is proportional to the strength of the electric field component perpendicular to the Z-axis, in shaped electric field region 145. The latter depends on the relative magnitudes of the dielectric constants ε2 and ε1, corresponding to dielectric layers 130 and 140, respectively.

Figure 3:
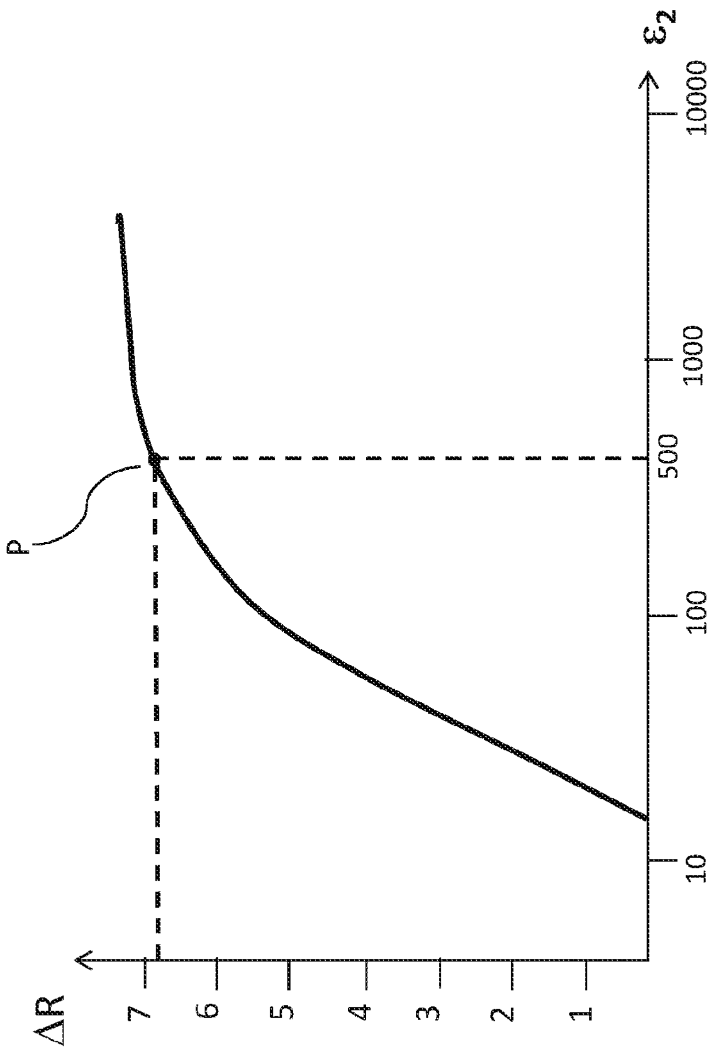
FIG. 3 is a semi-log plot showing electron intercept distance (ΔR) vs. the value of the high dielectric constant (ε2) for the DHGI of FIG. 2.

FIG. 3 shows a representative semi-log plot having a linear vertical scale for ΔR, in arbitrary units of length, and a logarithmic horizontal scale for ε2; the value of ε1 is fixed at 7.4. The value of ΔR is calculated by a computer simulation, in which electric fields are computed numerically including the effect of space charge inside the vacuum cavity, and SE trajectories are calculated using a conformal finite-element mesh. As ε2 approaches 10000, the curve approaches an asymptotic limit at about ΔR=7.5. However, such a large intercept distance is not needed to prevent the creation of electron avalanches; it is sufficient to choose a material having a more moderate dielectric constant, such as ε2=500, as indicated by point P in FIG. 3. Generally, the fabrication of materials with more moderate values of dielectric constant requires less high dielectric filler material and presents fewer issues of thermal compatibility as will be explained further in the following sections.

Figure 4:
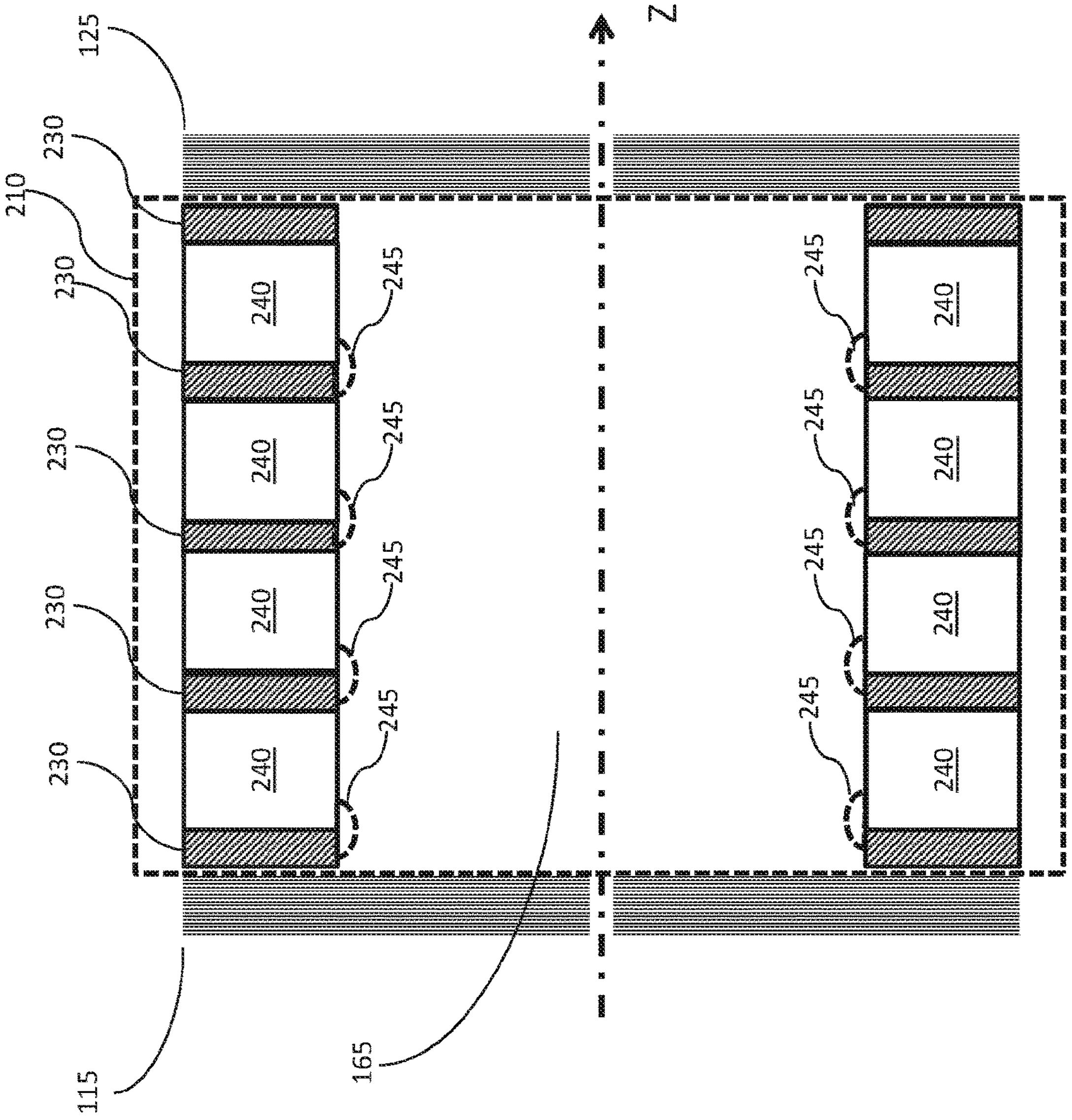
FIG. 4 is a cross-sectional diagram of an exemplary DHGI according to a preferred embodiment of the invention, consisting of nine dielectric layers.

FIG. 4 shows a cross-sectional diagram of an exemplary DHGI 210 according to a preferred embodiment of the invention, consisting of five dielectric layers 230 having a high dielectric constant ε2, such as ε2=500, and four dielectric layers 240 having a relatively lower dielectric constant ε1, such as ε1=7.4, arranged in an alternating structure. In this case there is a multiplicity of shaped dielectric field regions 245, each of which can deflect SE's towards the Z-axis, and thereby inhibit voltage breakdown due to surface flashover.

Figure 5:
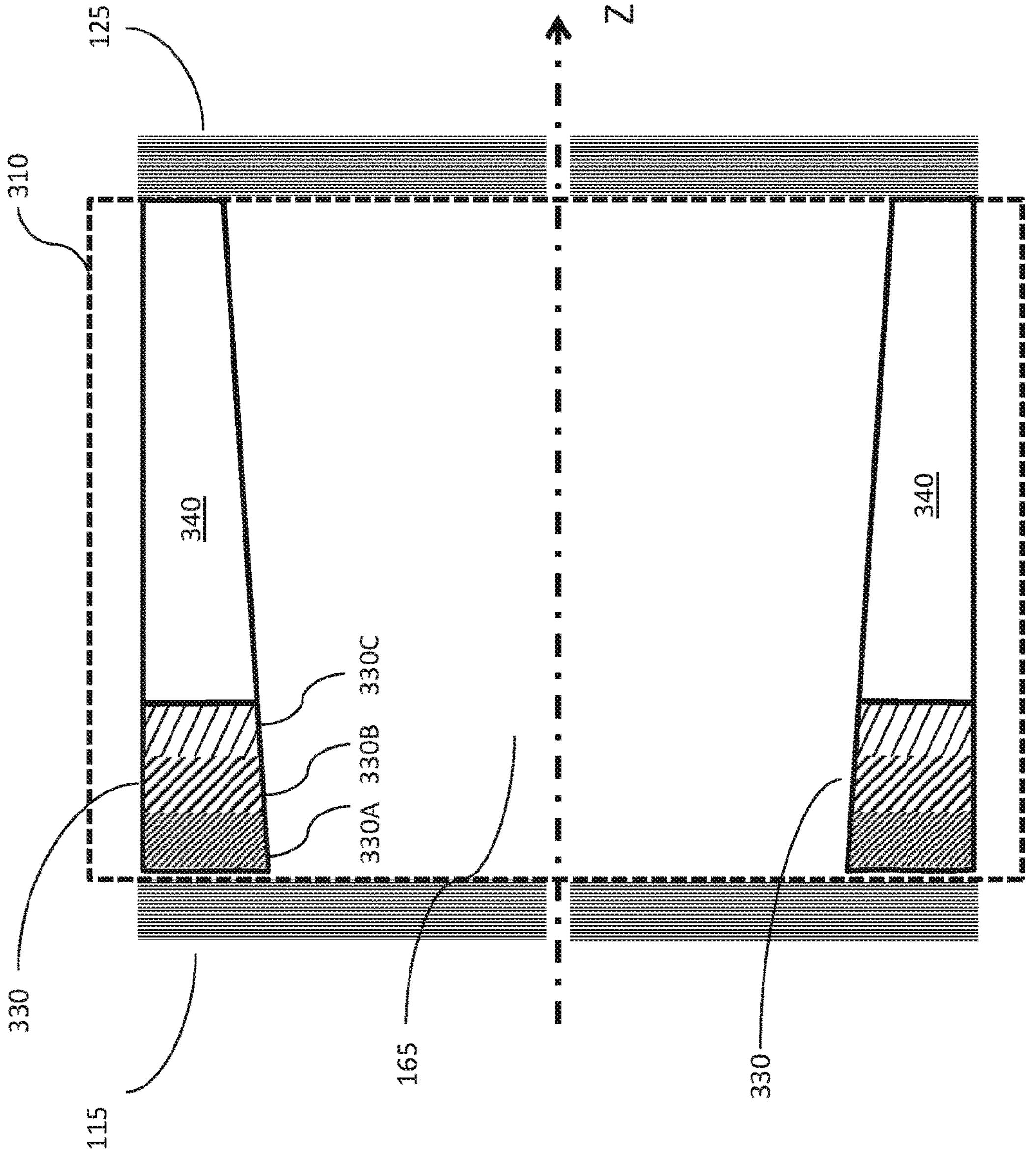
FIG. 5 is a cross-sectional diagram of an exemplary DHGI, according to a preferred embodiment of the invention, consisting of a variable dielectric layer with a gradual change in dielectric constant and a dielectric layer with a fixed dielectric constant.

FIG. 5 shows a cross-sectional diagram of an exemplary DHGI 310, according to a preferred embodiment of the invention, consisting of a variable dielectric layer 330 having a gradual change in dielectric constant and a dielectric layer 340 with a fixed dielectric constant ε1, such as ε1=7.4. Furthermore, FIG. 5 illustrates that the geometry of DHGI 310 may be non-cylindrical; for example, it may be conical or some other shape. In variable dielectric layer 330, the dielectric constant decreases from a high value of ε2A for material 330A, such as ε2A=500, to a moderate value of ε2B for material 330B, such as ε2B=125, and to a still lower value of ε2C, for material 330C, such as ε2C=25. That is, the values (ε2A, ε2B, ε2C, ε1) are monotonically decreasing. The advantage of this arrangement is that the bonding of material 330C to material 340, at the interface between layers 330 and 340, involves two materials whose physical properties, e.g. dielectric constants and thermal coefficients, are may be closely matched, so as to simplify the thermal processing.

By combining the features of FIG. 4 and FIG. 5, one may form more complicated embodiments of the invention, such as a DHGI with more than two dielectric layers having different values of dielectric constant arranged in an alternating structure and with at least one layer having a gradual variation in dielectric constant.

Dielectric Materials

High and variable dielectric material layers may preferably be made by casting and/or printing a mixture composed of a low dielectric matrix and high dielectric or metallic filler particles followed by a densification (sintering in ceramic materials) stage. The proportion of matrix to filler material is selected to achieve a desired dielectric constant value or profile.

The mixture can be in the form of a powder or a slurry. The material of the low dielectric matrix may be, for example: alumina ($Al_2O_3$), aluminum nitride (AlN), silicon dioxide ($SiO_2$), silicon nitride ($Si_3N_4$), titanium dioxide ($TiO_2$), polyamide, polystyrene, polyethylene, polyvinyl chloride (PVC), and plexiglass (PMMA, or Polymethyl methacrylate).

The material of the high dielectric filler particles may be, for example: $BaTiO_3$, $PbTiO_3$, $LaTiO_3$, $SrTiO_3$, doped NiO, $CaCu_3Ti_4O_{12}$, doped $TiO_2$ or $\alpha Fe_{0.5}\beta_{0.5}O_3$, where α represents the elements Ba, Sr, or Ca and β represents the elements Nb, Ta, or Sb.

DHGI Method of Manufacture

Figure 6:
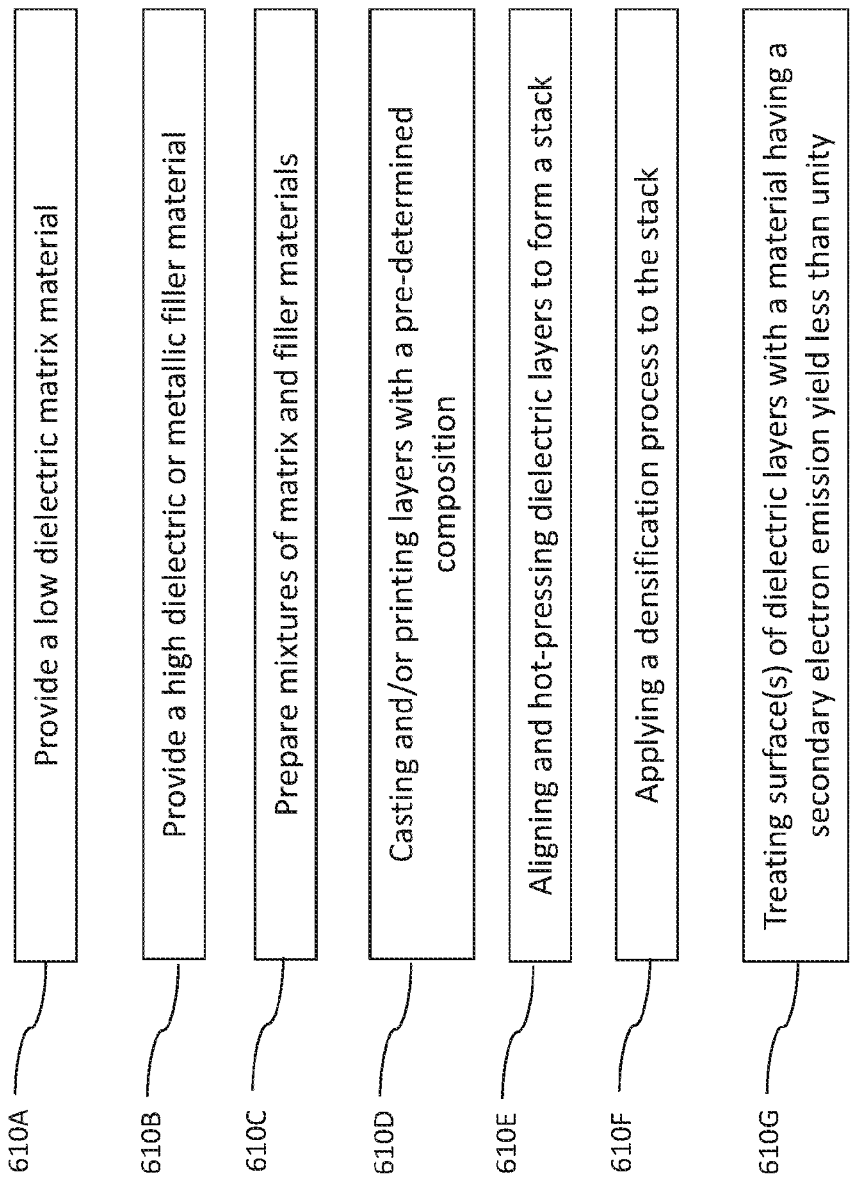
FIG. 6 is a block diagram of an exemplary method of manufacture of a DHGI, according to an embodiment of the invention.

FIG. 6 shows a block diagram of a method 600 of manufacturing a DHGI having two or more dielectric layers. The method consists of:

step 610A—providing a low dielectric matrix material;

step 610B—providing a filler material comprising high dielectric or metallic particles;

step 610C—preparing mixtures of matrix and filler materials;

step 610D—casting and/or printing layers with a predetermined composition;

step 610E—aligning and hot-pressing dielectric layers to form a stack; and step 610F—applying a densification process to the stack.

A co-sintered structure may have the advantage of providing superior vacuum tightness and mechanical stability, with fewer processing steps. In the case of ceramic dielectric layers, the densification process in step 610F typically includes a sintering process. After step 610F, the stack is cooled gradually to minimize thermally induced mechanical stresses.

An optional additional step 610G may be desirable which consists of treating one or more surfaces of the dielectric layers that are subject to incident SE bombardment with an insulating material having a low SE emission yield; that is, a material whose SE emission yield is less than unity over a wide range of incident SE energies. Examples of such materials are metal oxides or nitrides, where the metal may be, for example, titanium, chromium, or vanadium. The treatment is preferably done by chemical or physical vapor deposition (CVD or PVD) or by doping the matrix material.

It will be appreciated that the above descriptions are intended only to serve as examples, and that many other embodiments are possible within the scope of the present invention as defined in the appended claims.

What is claimed is:

1. A dielectric high gradient insulator device comprising a stack of more than two dielectric layers aligned along a longitudinal axis and having different values of dielectric constant which are arranged in an alternating structure;

at least one of the dielectric layers having a stepwise variation in dielectric constant;

the layers configured to form a shaped electric field, when the device is placed between electrodes having a voltage difference;

the shaped electric field being in a region proximal to a surface of the at least two layers, and deflecting negatively charged particles away from said surface;

thereby inhibiting voltage breakdown of the device.

2. The device of claim 1 wherein a surface of said dielectric layers comprises a material having a secondary electron emission yield less than unity.

3. The device of claim 1 wherein at least one dielectric layer comprises a low dielectric material selected from a group consisting of alumina ($Al_2O_3$), aluminum nitride (AlN), silicon dioxide ($SiO_2$), silicon nitride ($Si_3N_4$), titanium dioxide ($TiO_2$), polyamide, polystyrene, polyethylene, polyvinyl chloride (PVC), and plexiglass (Polymethyl methacrylate).

4. The device of claim 1 wherein at least one dielectric layer comprises a dielectric material selected from a group consisting of $BaTiO_3$, $PbTiO_3$, $LaTiO_3$, $SrTiO_3$, doped NiO, $CaCu_3Ti_4O1_2$, doped $TiO_2$ or $\alpha Fe_{0.5}\beta_{0.5}O_3$, where α represents the elements Ba, Sr, or Ca and β represents the elements Nb, Ta, or Sb.

5. The device of claim 1 wherein at least one dielectric layer comprises metallic particles.

6. The device of claim 1 wherein said device is a component of a charged particle accelerator, a charged plasma source, an X-ray generating machine, or a pulsed power system.

7. The device of claim 1 wherein the different values of dielectric constant have a maximum value and a minimum value whose ratio is at least an order of magnitude.

* * * * *